April 5, 1927.
J. STIRISS
ATOMIZER
Filed Dec. 18, 1923
1,623,504
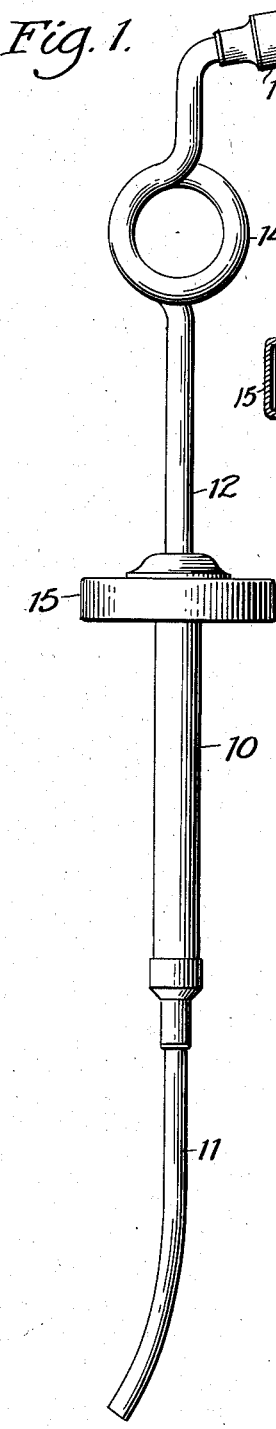
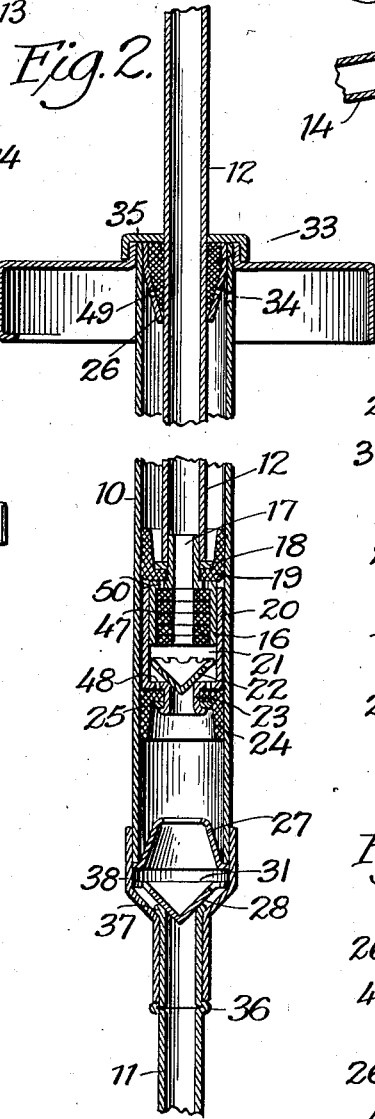
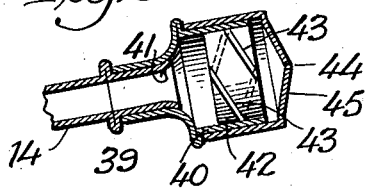
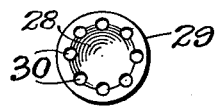
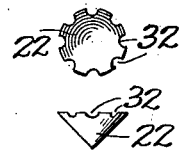
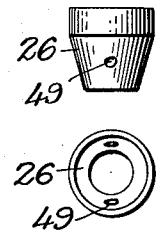
Inventor,
Jacob Stiriss,
By James F. Duhamel,
Attorney.

Patented Apr. 5, 1927.

1,623,504

UNITED STATES PATENT OFFICE.

JACOB STIRISS, OF NEW YORK, N. Y., ASSIGNOR TO THE LARVEX CORPORATION, OF BROOKLYN, NEW YORK, A CORPORATION OF NEW YORK.

ATOMIZER.

Application filed December 18, 1923. Serial No. 681,391.

This invention relates to atomizers and has for its object the use of sheet metal and metal tubing in its construction with all of the parts assembled and fitted together by compression and without the use of screws, brazing or soldering.

A further object of the invention is the elimination of ball valves and means are provided to constantly expand the plunger packing so that the same may fit the barrel to prevent the passage of air or liquid and to also provide means for moistening the packing when the atomizer is not in use.

These and other objects of the invention are more fully described in the following specification, set forth in the appended claims and illustrated in the accompanying drawings, wherein:

Figure 1 is an elevation of the improved atomizer.

Fig. 2 is a fragmentary vertical sectional view through the pump cylinder.

Fig. 3 is a sectional view through the sprayer.

Fig. 4 is a view of the lower valve from two directions.

Fig. 5 is a similar view of the upper valve.

Fig. 6 is a like view of the upper spreader.

Devices of this nature, as heretofore constructed, have had the joints and various parts machine turned and united by soldering and screw threads but this arrangement is costly and the threads very often cause the obstruction of the spray outlets. Where valves are necessary, small balls have been invariably used but true balls are expensive and on account of their shape have a tendency to wedge and become dislocated from their normal seat and held in other parts of the pump, especially when a somewhat glutinous liquid is used in the spray. Another serious failure in these small devices is that the leather cup packing about the plunger of the pump, if not constantly used, will dry and shrink and fail to function for sometime when again operated.

The improved atomizer embraces some well known features such as the pump cylinder 10, the inlet tube 11, and the combined piston and discharge tube 12 having the sprayer 13 at its upper end. The tube 12 is also formed with a circular band 14 for the index finger of the operator who can by this means reciprocate the piston while holding a bottle on which the cap 15 may be fitted.

As will be seen in Fig. 2 the lower end of the piston tube 12 carries the piston that consists primarily of an inner shell 16 having a reduced upper end 17 that enters the tube 12 which is shrunk thereon securing a washer 18 and the packing 19.

Upon the shell 16 is forced another shell 20 permanently securing it so as to form a valve and moistening chamber 21 in which plays the valve 22 but normally seated on the inlet 23 that is a nipple at the lower end of shell 20 and carries the lower packing 24 and a washer 25, the end of the nipple being enlarged to secure these latter parts thereon.

As the piston reciprocates it is desirable to have the packings 19 and 24 exert a pressure against the inner sides of the cylinder and at the same time to relieve the piston from violent and sudden contact with the ends of the cylinder 10. Both of these objects are attained by means of the tapered spreaders 26 and 27, the former being at the upper end of the cylinder and permitting the upper edge of the packing 19 to enter the gradually reduced space between the spreader and the cylinder walls where a cushion is offered to the upward stroke.

The downward stroke of the piston is arrested by the spreader 27 which operates as its companion 26 and both also tend to force the packing against the cylinder at each stroke and thus prevent shrinking or bending away from the cylinder but cause continuous contact.

The construction of the valves will be seen in Figs. 4 and 5 where the lower valve will be seen as an inverted cone 28 having the flange 29 and the perforations 30 near its edge but partly in the flange and partly in the cone. While the valve loosely fits within the chamber 31 its movement is confined to the space between the seat 37 and the spreader 27 which in turn is held against the bottom of the cylinder and the perforations 30 are provided to allow the water to pass upward.

The upper valve 22 is also conical but has no flange as it must be of smaller diameter than its companion member on account of the reduced space in the chamber 21. Notches 32 are formed around its edge to allow the water to pass while its edge in connection with the bottom of shell 16 guides it in its movements, within a limited space.

The upper spreader is forced and wedged into the upper end of the cylinder and contains the packing 33 to prevent the escape of liquid at that point while any liquid that might escape into the cylinder above the piston is liberated through the vent 34.

A cap closes the end of the cylinder while the cap 15 is shrunk on the latter member. The shoulder 36 in conjunction with the enlarged end 37 unites the tube and the reduced end of the lower end 38 of the cylinder which is shrunk on the latter.

The latter construction is reproduced in the sprayer, as will be seen in Fig. 3 where it will be seen that the tube 14 is formed with a shoulder 39 and after passing into the head 40 is flared as at 41, securing the parts together. Within this head 40 is the sprayer 42 that consists of a round block with spiral grooves 43 around its outer surface and forming passages between the inside and outside of the head and liquid that is forced outward in a gyratory manner thereby is broken up and is expelled instantly through a small opening 44 in the cap 45. The head 40 is shrunk on the block 42 and the cap is shrunk on the head thus doing away with expensive screw cutting or soldering.

For the purpose of supplying the packing with moisture during shipping for some length of time the inner shell 16 is provided with a plurality of absorbent washers 47 and the shell 20 has lower vents 48 that permit a small amount of liquid to escape to the packing 24 and keep it slightly wet and in condition for operation.

The spreader 26 also has vents 49 that allow the escape of moisture that is absorbed by the packing 19 to keep it in condition for some time and vents 50 also admit moisture from the washers 47.

It is obvious that the parts may be otherwise arranged or modified without departing from the essential features above described or from the scope of the appended claims.

From the above and the drawings it is apparent that the parts, with the exception of the block 42, may be cut or stamped from sheet metal and at the same time formed into their proper shapes and ready to be fitted together with little labor or expense.

What I claim as new is:

1. In an atomizer, the combination of a tubular pump cylinder, a piston equipped with a flexible packing adapted to play in the cylinder and having a valve chamber, a tubular rod adapted to operate the piston, an inlet valve at the lower end of the cylinder, an outlet valve within the piston, and spreaders at each end of the cylinder for the flexible packing carried by the piston, all of said elements except the flexible packing being made of sheet metal.

2. In an atomizer, a pump made of sheet metal elements and comprising a cylinder, a hollow piston for the pump and carrying a fibrous packing at each end, fibrous moisture retaining means within the piston, a hollow piston rod, and spreaders adapted to operate on the fibrous packing.

3. In an atomizer, the combination of a sheet metal pump cylinder, a sheet metal piston having a valve chamber, a sheet metal piston rod comprising an outlet pipe and coupled to the piston by compression, a sheet metal check valve in the valve chamber, moisture retaining means within the piston, flexible packing carried at each end of the piston, spreaders positioned at each end of the cylinder and adapted to spread the packing, and a sheet metal inlet valve at the inlet end of the cylinder.

4. In an atomizer, the combination of a tubular sheet metal pump cylinder, an inlet pipe compressed upon the end of the cylinder, a sheet metal piston having a valve chamber, liquid absorbing material in the piston, a sheet metal check valve having notches at its edge and adapted to play in the valve chamber, a tubular piston rod shrunk on the upper end of the piston, flexible packing at the ends of the piston, a perforated sheet metal spreader at the upper end of the cylinder, moisture absorbing material positioned in engagement with the upper face of the spreader, a sheet metal spreader at the lower end of the cylinder and adapted to spread the packing at the lower end of the piston, and a sheet metal inlet valve having a perforated flange and located below the latter spreader.

5. In an atomizer, the combination of a sheet metal pump cylinder, a sheet metal piston having a valve chamber, a sheet metal piston rod comprising an outlet pipe and coupled to said piston by means of pressure, a sheet metal cap shrunk on the upper end of the cylinder, an inlet tube connected with the lower end of the cylinder, by a compressed coupling, moisture retaining means within the piston, flexible moisture retaining packing at each end of the piston, sheet metal spreaders for the flexible packing at each end of the piston, a sheet metal valve in the piston, and a sheet metal valve at the lower end of the cylinder.

6. An assembly of the character described embodying a tubular sheet metal pump cylinder, and a sheet metal cap at the outlet end of the cylinder and having tight permanent frictional engagement therewith, and a check valve at the inlet end of the cylinder, in combination with a piston embodying telescoping parts having tight frictional permanent engagement with one another to form a chamber within the piston, a check valve in said chamber, flexible packing carried by the piston, a hollow piston stem having tight, permanent, frictional engagement with the piston, and extending through an opening in the cap, and spreaders positioned at the opposite ends of the cylinder and cooperating with the piston packing when the piston is reciprocated.

7. An assembly of the character described embodying a tubular, sheet metal pump cylinder having an inlet, an inlet valve cooperating therewith, and a sheet metal cap having tight, permanent, frictional engagement with the cylinder, in combination with a piston embodying telescoping parts having tight, permanent, frictional engagement with one another to form a chamber within the piston, a check valve in said chamber, flexible packing carried by the piston, and a hollow piston stem having tight, permanent, frictional engagement with the piston.

In testimony whereof I hereunto affix my signature.

JACOB STIRISS.